(12) United States Patent
Song et al.

(10) Patent No.: US 10,981,750 B2
(45) Date of Patent: Apr. 20, 2021

(54) PROGNOSTIC ANALYSIS OF ELEVATOR PERFORMANCE USING SENSORS AND INTERNET OF THINGS

(71) Applicant: Otis Elevator Company, Farmington, CT (US)

(72) Inventors: Jinho Song, Farmington, CT (US); Aditya Swami, Maharastra (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 852 days.

(21) Appl. No.: 15/712,630

(22) Filed: Sep. 22, 2017

(65) Prior Publication Data

US 2018/0086597 A1 Mar. 29, 2018

(30) Foreign Application Priority Data

Sep. 23, 2016 (IN) .............................. 201611032535

(51) Int. Cl.
- *B66B 5/00* (2006.01)
- *B66B 1/34* (2006.01)
- *G05B 15/02* (2006.01)

(52) U.S. Cl.
CPC .......... *B66B 5/0025* (2013.01); *B66B 1/3461* (2013.01); *B66B 5/0087* (2013.01); *G05B 15/02* (2013.01)

(58) Field of Classification Search
CPC ... B66B 5/0025; B66B 5/0087; B66B 1/3461; G05B 15/02
USPC ......................................................... 187/393
See application file for complete search history.

(56) References Cited

U.S. PATENT DOCUMENTS

| | | | | |
|---|---|---|---|---|
| 4,330,838 A * | 5/1982 | Yoneda | ................. | B66B 5/0087 187/393 |
| 4,622,538 A * | 11/1986 | Whynacht | ............. | B66B 5/0006 340/500 |
| 4,698,780 A * | 10/1987 | Mandel | ................. | B66B 5/0025 187/393 |
| 4,930,604 A * | 6/1990 | Schienda | .............. | B66B 5/0006 187/393 |
| 5,027,299 A * | 6/1991 | Uetani | .................. | B66B 5/0037 702/122 |
| 6,330,935 B1 * | 12/2001 | Systermans | ........... | B66B 5/0025 187/391 |

(Continued)

FOREIGN PATENT DOCUMENTS

| | | |
|---|---|---|
| CN | 102442596 A | 5/2012 |
| CN | 102923538 A | 2/2013 |

(Continued)

OTHER PUBLICATIONS

Kubota et al. "New Elevator Maintenance System Employing Diagnostic Technology: Herios", 1997, 7 pages.

(Continued)

*Primary Examiner* — David S Warren
(74) *Attorney, Agent, or Firm* — Cantor Colburn LLP

(57) ABSTRACT

A system and/or method for receiving a data capture from an elevator sensor and executing a prognostic analysis of the data capture to identify operational issues and resolutions to the operational issues. The system and/or method can further receive at least one of a verification of the operational issues and the resolutions and execute the resolutions upon verification to resolve the operational issues.

18 Claims, 5 Drawing Sheets

(56) References Cited

U.S. PATENT DOCUMENTS

| | | | |
|---|---|---|---|
| 6,863,161 B2 * | 3/2005 | Mearns | B66B 5/0006 |
| | | | 187/247 |
| 7,575,103 B2 * | 8/2009 | Chiba | B66B 5/0012 |
| | | | 187/247 |
| 10,183,837 B2 * | 1/2019 | Kusserow | B66B 1/3461 |
| 10,239,727 B2 * | 3/2019 | Gonzalez Gallegos | B66B 5/14 |
| 10,597,254 B2 * | 3/2020 | Mahoney | B66B 5/0087 |
| 10,696,519 B2 * | 6/2020 | Bruno | B66B 9/00 |
| 10,723,593 B2 * | 7/2020 | Saarela | B66B 5/0031 |
| 10,745,244 B2 * | 8/2020 | Sudi | B66B 5/0031 |
| 2004/0193518 A1 | 9/2004 | Deplazes | |
| 2004/0206583 A1 * | 10/2004 | Mearns | B66B 5/0006 |
| | | | 187/391 |
| 2008/0283342 A1 * | 11/2008 | Deplazes | B66B 5/0025 |
| | | | 187/391 |
| 2009/0265193 A1 | 10/2009 | Collins et al. | |
| 2011/0315490 A1 | 12/2011 | Shi et al. | |
| 2013/0246928 A1 | 9/2013 | Hovi et al. | |
| 2014/0262629 A1 * | 9/2014 | Toutaoui | B66B 5/0087 |
| | | | 187/393 |
| 2015/0284214 A1 | 10/2015 | Park et al. | |
| 2016/0185568 A1 * | 6/2016 | Kusserow | H04W 52/0203 |
| | | | 340/3.31 |
| 2017/0029244 A1 * | 2/2017 | Madarasz | B66B 5/0037 |
| 2017/0253461 A1 * | 9/2017 | Villa | B66B 1/3492 |
| 2019/0152744 A1 * | 5/2019 | Kusserow | B66B 5/0037 |
| 2020/0207578 A1 * | 7/2020 | Liaskas | B66B 25/006 |
| 2020/0223660 A1 * | 7/2020 | Kinnari | B66B 1/3461 |

FOREIGN PATENT DOCUMENTS

| | | |
|---|---|---|
| CN | 103274269 A | 9/2013 |
| CN | 103874647 A | 6/2014 |
| CN | 104192660 A | 12/2014 |
| CN | 104555627 A | 4/2015 |
| CN | 204408574 U | 6/2015 |
| CN | 104773625 A | 7/2015 |
| CN | 104944243 A | 9/2015 |
| CN | 204689294 U | 10/2015 |
| CN | 205328386 U | 6/2016 |
| CN | 104555627 B | 8/2016 |
| CN | 104229577 B | 12/2016 |
| CN | 104444674 B | 5/2017 |
| CN | 204022161 U | 12/2020 |
| WO | 2002064479 A1 | 8/2002 |
| WO | 2013055346 A1 | 4/2013 |
| WO | 2015018697 A1 | 2/2015 |
| WO | 2016091309 A1 | 6/2016 |

OTHER PUBLICATIONS

Search Report dated Feb. 12, 2018 in EP Application No. 17192731, 18 pages.

Anonymous, "Elevator Controller", URL<https://www.raspberrypi.org/forums/viewtopic.php?f=41&t=28131>, 2013, 5 pages.

Anonymous, Say goodbye to downtime and delays with predictive smart technologies, URL:<http://www.urban-hub.com/ideas/say-goodbye-to-downtime-and-delays-with-predictive-smart-technologies/>, 12 pages.

Antone Gonsalves, "ThyssenKrupp Gets a Lift From IoT", 2014, 3 pages.

Bussiness Cloud News, "Azure to lift elevators into the cloud with IoT-based maintenance service", URL:<http://www.businesscloudnews.com/2015/11/02/azure-to-lift-elevators-into-the-cloud-with-iot-based-maintenance-service/> 2015, 4 pages.

Chinese Search Report for Application No. 201710870326.3; dated Jul. 3, 2020; 8 Pages.

European Search Report for Application No. 17192731.2; dated Jun. 25, 2020; 4 Pages.

Kubota et al. "New Elevator Maintenance System Empoying Diagnostic Technology: Herios", 1997, 7 pages.

* cited by examiner

PROGNOSTIC ANALYSIS OF ELEVATOR PERFORMANCE USING SENSORS AND INTERNET OF THINGS

BACKGROUND

This application claims the benefit of priority to Indian Application No. 201611032535 filed Sep. 23, 2016, the disclosure of which is incorporated herein by reference in its entirety.

BACKGROUND

Elevators and elevator systems comprise complex electro-mechanical mechanisms for transporting people and items. Over time and through use these complex electro-mechanical mechanisms can malfunction and, in turn, require repair. When a request for the repair is received, mechanics commonly travel to a location of the elevators and elevator systems multiple times to fix the malfunction. For example, the mechanics will travel multiple times to and from a location of the elevators and elevator systems with respect to diagnosing the malfunction, retrieving parts, analyzing elevator operations, diagnosing, retrieving additional parts, etc. This repetitive travel incurs unwanted costs due to time wasted and delays in repair.

The disclosure relates generally to a prognostic analysis of elevator performance using sensors and the internet of things.

BRIEF DESCRIPTION

According to an embodiment, a method is provided. The method comprises receiving a data capture from an elevator sensor; executing a prognostic analysis of the data capture to identify operational issues and resolutions to the operational issues; receiving at least one of a verification of the operational issues and the resolutions; and executing the resolutions upon verification to resolve the operational issues.

According to another embodiment or the method embodiment above, the elevator sensor can be a micro-electromechanical system.

According to another embodiment or any of the method embodiments above, the data capture can be a recording of video, audio, motion, infrared, radar, sonar, ultrasound, depth, velocity, acceleration, and vibration analytics of the elevator.

According to another embodiment or any of the method embodiments above, the method can comprise automatically reporting the operational issues and resolutions to a user, According to another embodiment or any of the method embodiments above, the receiving of the verification can be in response to the reporting of the operational issues and resolutions causes.

According to another embodiment or any of the method embodiments above, the verification can be received as an input from a user.

According to another embodiment or any of the method embodiments above, the method can comprise automatically scheduling a mechanic to implement the resolutions, the resolutions include an on-site fix of the operational issues with respect to the resolutions.

According to another embodiment or any of the method embodiments above, the processor and the elevator sensor can be local to an intelligent building system comprising an elevator.

According to another embodiment or any of the method embodiments above, the elevator sensor can be local to an intelligent building system comprising an elevator, and a cloud environment in communication with the intelligent building system can comprise the processor.

According to an embodiment, a system, comprising a processor and a memory storing program instructions thereon, the program instructions executable by a processor to cause the system to perform: receiving a data capture from an elevator sensor; executing a prognostic analysis of the data capture to identify operational issues and resolutions to the operational issues; receiving at least one of a verification of the operational issues and the resolutions; and executing the resolutions upon verification to resolve the operational issues.

According to another embodiment or the system embodiment above, the elevator sensor can be a micro-electromechanical system.

According to another embodiment or any of the system embodiments above, the data capture can be a recording of video, audio, motion, infrared, radar, sonar, ultrasound, depth, velocity, acceleration, and vibration analytics of the elevator.

According to another embodiment or any of the system embodiments above, the program instructions can be executable by a processor to cause the system to perform automatically reporting the operational issues and resolutions to a user, According to another embodiment or any of the system embodiments above, the receiving of the verification can be in response to the reporting of the operational issues and resolutions causes.

According to another embodiment or any of the system embodiments above, the verification can be received as an input from a user.

According to another embodiment or any of the system embodiments above, the program instructions can be executable by a processor to cause the system to perform automatically scheduling a mechanic to implement the resolutions, the resolutions include an on-site fix of the operational issues with respect to the resolutions.

According to another embodiment or any of the system embodiments above, the processor and the elevator sensor can be local to an intelligent building system comprising an elevator.

According to another embodiment or any of the system embodiments above, the elevator sensor can be local to an intelligent building system comprising an elevator, and a cloud environment in communication with the intelligent building system can comprise the processor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Embodiments relate to a prognostic analysis of elevator performance using sensors and the internet of things and, more particularly, prognostic analyses of elevator performance using micro-electro-mechanical systems (MEMS) and cloud servers. For instance, in an embodiment, a computing device of an intelligent building system utilizes a MEMS, as a data capturing device regarding video, audio, motion, infrared, radar, sonar, ultrasound, depth, velocity, acceleration, and/or vibration analytics, to monitor an elevator. The data is then utilized by machine-learning algorithms of the computing device, which perform prognostic analysis, to check for any operational issues with the elevator. The prognostic analysis can include neural networks, using pattern recognition, and the like. Any operational issues that are identified by the prognostic analysis can be automatically reported to a user (e.g., operational analyst accessing the computing device) for further scrutiny. Along with reporting operational issues, the computing device can report resolutions to the operational issues to the user. The operational issues and the resolutions reported to the user by the computing device can be verified by the user. This verification can be input into the computing device. In response to the input of the verification, the computing device can then automatically execute the resolutions and/or schedule a mechanic for an on-site fix of the elevator.

Figure 1:
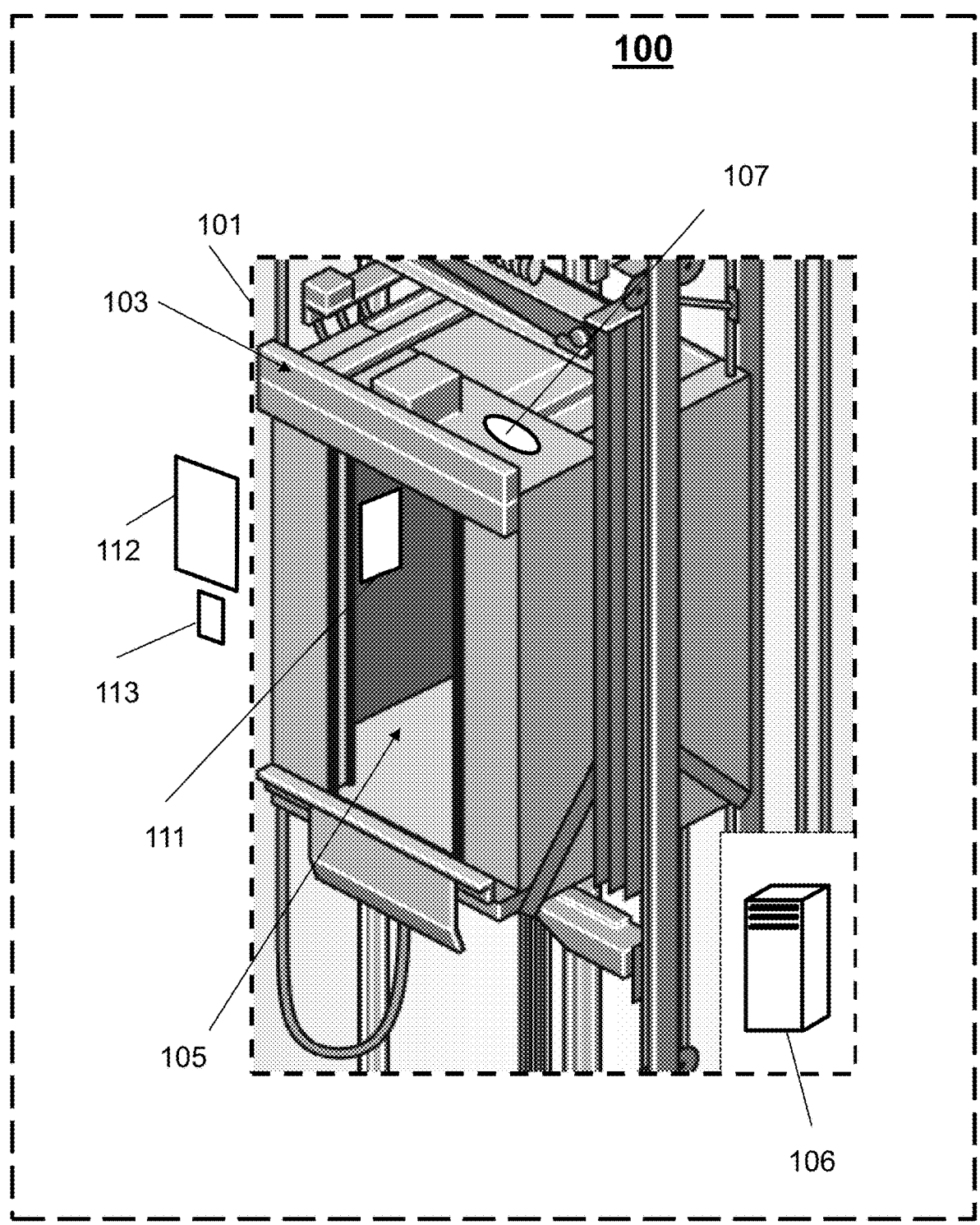
FIG. 1 illustrates an example of a schematic of an intelligent building system according to one embodiment.

Referring now to FIG. 1, an example schematic of an intelligent building system 100 is shown. The intelligent building system and elements therein may take many different forms and include multiple and/or alternate components and facilities. The intelligent building system 100 is only one example of an intelligent building system and is not intended to suggest any limitation as to the scope of use or operability of embodiments of the invention described herein (indeed additional or alternative components and/or implementations may be used). The intelligent building system 100 includes an elevator sub-system 101. The elevator sub-system 101 comprises an elevator 103 that includes an elevator cab 105, a detector 107, a computing device 106, and an internal display 111. Further, the intelligent building system 100 includes an external display 112 and an interface 113.

The intelligent building system 100 may implement operations and/or communicate signals between the elevator sub-system 101 and elements therein, the external display 112, the interface 113, and other systems and sub-systems that assist passengers of the elevator 103. Examples of operations and/or signals may include generating an elevator call (e.g., a hall call), canceling an elevator call, detecting/identifying passengers, etc. Further, the communications of the intelligent building system 100 can be encrypted, e.g., a protocol such as hypertext transfer protocol secure (HTTPS) for communication to a mobile browser or an advanced encryption standard (AES) for communication to a display. Further, the intelligent building system 100 can utilize the same protocols, and even hardware, for its components as are used by a passenger and a user device of the passenger to leverage cost and implementation benefits, such as by utilizing a wireless technology standard/protocol for exchanging data over short distances.

The elevator sub-system 101 can comprise electromechanical arrangements (e.g., a controller and/or computing device, such as computing device 106, that communicates with at least one motor) that control speed, position, and door operation of an elevator or bank of elevators (e.g., elevator 103). The elevator cab 105 has a finite capacity to hold occupants, which include objects and people, based on the dimensions of the elevator.

The computing device 106 of the elevator sub-system 101 may control and monitor (or communicate with other systems and sub-systems through any network communication technologies that can control and monitor) the elevator 103, the elevator cab 105, and the detector 107, such that the elevator sub-system 101 may operate the elevator or bank of elevators as a passenger and a passenger device of the passenger interacts with the intelligent building system 100 (e.g., makes hall calls or requests occupancy information). Examples of communication technologies include electromagnetic, e.g., radio frequency ("RF"), magnetic (near field communication, "NFC"), short wave radio, proximity systems, Bluetooth Low Energy (BLE) beacons, etc. Further schematics of the computing device 106 and communication technologies are described herein with respect to FIG. 5. In an embodiment, the computing device 106 can implement the operations of generating an elevator call (e.g., a hall call), canceling an elevator call, detecting/identifying passengers, receiving a data capture of an elevator from sensor (e.g., the detector 107); executing a prognostic analysis of the data capture (using pattern recognition) to identify operational issues of the elevator sub-system 101 and resolutions to the operational issues; receiving a verification of the operational issues and the resolutions; and executing the resolutions upon verification to resolve the operational issues, etc. The computing device 106 can also implement a bypass feature, communicate with devices external to the intelligent building system 100, perform additional reliability and convenience communication operations, etc. Note that the computing device 106 can be included in and part of the intelligent building system 100 and elevator sub-system 101 as shown in FIG. 1, can be integrated with the elevator 103 itself, and can be included external to the intelligent building system 100 and/or elevator sub-system 101.

The detector 107 can include any sensor that detects events or changes in the sensors include cameras, infrared sensors, motion sensors, radar sensors, sonar sensors, ultrasound sensors, depth sensors, microphones, vibration sensors, velocity sensors, acceleration sensors, or any other known types of sensing devices. In an embodiment, the sensor of the detector 107 can be a MEMS device. The MEMS device can be defined as by die-level components of first-level packaging, and include pressure sensors, accelerometers, gyroscopes, microphones, digital mirror displays, microfluidic devices, or any other type of known MEMS devices.

The detector 107 can include a collection device that receives these detected events and changes from the sensor. Examples of the collection device include a single-board computer, a smartphone, the computing device 106, a memory device, a solid state memory, a hard drive, a server, a database, etc. In another embodiment, the detector 107 can be referred to as an event producer.

In an embodiment, detector 107 may be connected to the computing device 106, one of the displays 111 and 112, or other device through either wired or wireless communication. If the communication is wireless (such as with a smart phone), a short range communication technology can be utilized with additional privacy protection so that any information communicated is protected from intrusion.

The displays 111 and 112 can be any output device or technology for presentation of multimedia content. Examples of any output device or technology for presentation of multimedia content include light emitting diode displays, liquid crystal displays, flat panel displays, or any other known display device. One embodiment of the internal display 111 includes an electronic visual display configured on an internal wall of the elevator cab 105 (e.g., as shown in FIG. 1) that outputs multimedia content transmitted electronically from the computing device 106 (or an external media server) for visual reception by a current passenger. One embodiment of the external display 112 includes an electronic visual display configured near an entry way of the elevator 103 that outputs multimedia content transmitted electronically from the computing device 106 for visual reception by a waiting passenger. Another embodiment of the displays 111 and 112 includes a display of a passenger device of a waiting or current passenger that is in communication with the intelligent building system 100.

The interface 113 can be any shared boundary across which two separate entities exchange information. The exchange can be between software, computer hardware, peripheral devices, humans, and combinations of thereof. In turn, embodiments of the interface 113 can include barcodes, two-dimensional barcodes (e.g., as a quick response code), near field communications transmitters, etc. that in response to a passenger device scanning or interacting with the interface 113 causes the intelligent building system 101 to provide multimedia content via the displays 111 and 112. Further, the interface 113 may also be integrated with the displays 111 and 112, such as a touchscreen that can display the multimedia content and accept passenger inputs. In an embodiment, the interface 113 may include one or more devices, such as a keyboard, a pointing device, a computer mouse, etc. and/or one or more devices that enable a user to interact with the intelligent building system 100 and/or elevator sub-system 101.

Figure 2:
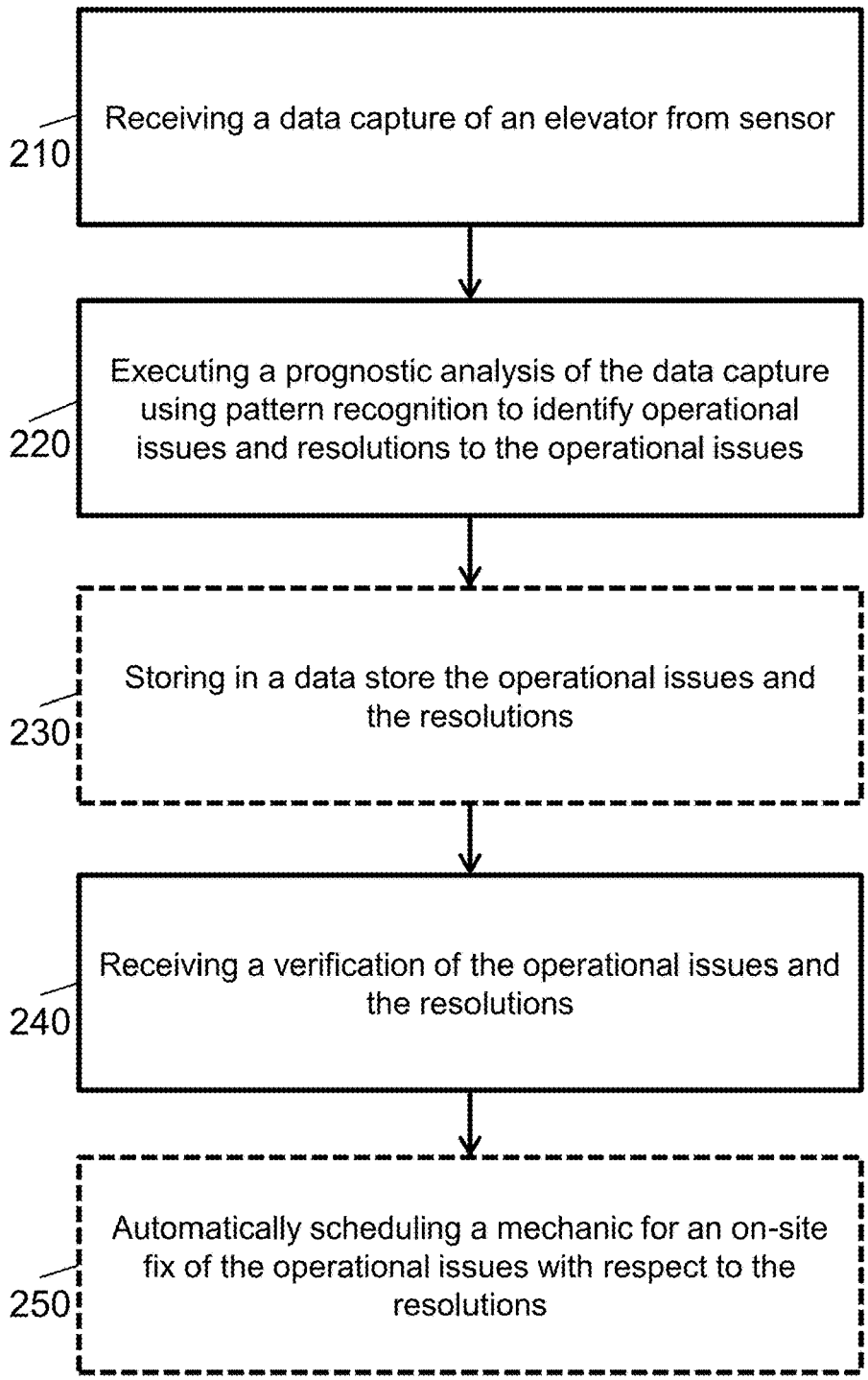
FIG. 2 illustrates a process flow of prognostic analysis of elevator performance according to one embodiment.

Operations of the intelligent building system 100 will now be described. An example of a set of operations by the intelligent building system 100 will be described with reference to FIG. 2, which illustrates a process flow 200 of prognostic analysis of elevator performance according to one embodiment.

Process flow 200 begins at start block 210 where the intelligent building system 100 receives a data capture of an elevator from sensor. In an embodiment, the sensor is a MEMS sensor. The MEMS sensor communicates directly with a collection device, such as a single-board computer, a smartphone, or computing device 106.

At block 220, the intelligent building system 100 causes a prognostic analysis of the data capture (using pattern recognition) to identify operational issues and resolutions to the operational issues. The prognostic analysis can be internal (e.g., by the computing device 106) or external to the intelligent building system 100 (e.g., by a cloud environment connected to the intelligent building system 100). Operational issues include excessive vibrations, excessive noise, uneven movement, etc. Baseline metrics can be used determined to determine when the data capture is outside the scope of normal operations. Resolutions are determined solution that address or solve a corresponding operational issue (e.g., firmware related fix that can be automatically sent to the computing device 106). The resolution and baseline metrics can be stored on the computing device 106 to support a local execution of the prognostic analysis. The resolution and baseline metrics can also be stored on the cloud environment to support a cloud execution of the prognostic analysis.

In an embodiment, the computing device 106 receives the data capture (also referred to as collected data). The collected data is then processed locally by the computing device using a machine learning algorithms. The machine learning algorithms perform a prognostic analysis using pattern recognition to determine operational issues. Note that in embodiments where the collection device is a single-board computer for aggregating the collected data, the single-board computer can transfer the collected data to the computing device 106 for processing. Further, in embodiments where the collection device is a smartphone, the smartphone can transfer the collected data to the computing device 106 for processing or the smartphone can process the collected data locally.

In an embodiment, the collected data is then processed in a cloud environment connected to the intelligent building system 100. For instance, a physical and/or virtual device of the cloud environment in communication with the intelligent building system 100 can process the collected data. In turn, the intelligent building system 100 can provide, push, and/or stream the collected data to the cloud environment to embody the advantage of omitting storage and/or processing local to the intelligent building system 100. The providing and/or pushing of the collected data could occur at predetermined time intervals (e.g., every evening at 11:00 PM) or when operational issues are detected.

At dashed-block 230, the intelligent building system 100 stores in a data store the operational issues and the resolutions. For example, the collected data, any operational issues, and/or any resolutions can be stored into a data store for future usage or analysis. The data store can be local to the intelligent building system 100, within a cloud environment, or combination thereof. Note that the dotted block 230 is shown with a dashed outline to illustrate that this block is optional for the process flow 200.

At block 240, the intelligent building system 100 receives a verification of the operational issues and the resolutions. Verification can be communicated through a cloud environment or locally within the intelligent building system 100.

In an embodiment, any critical data logs or problems can be automatically reported or notified to a user (e.g., operational analyst accessing the computing device 106). This reporting may be displayed on the displays 111 and 112 or sent to a mobile phone, a web service, a smart watch, etc. Once a report or a notification is received, the analyst can review and scrutinize the operational issues and the resolutions. If the analyst agrees with the operational issues and the resolutions provided via the prognostic analysis, the analyst can verify the operational issues and the resolutions.

In an embodiment, the verification can be received as a direct input by the computing device 106 from the interface 113. In another embodiment, the verification can be received as an input by the computing device 106 from the mobile phone, the web service, the smart watch, etc. In another embodiment, the verification can be received from a physical and/or virtual device of a cloud environment operated by the analyst. Note that, if the analyst needs further information to analyze the operational issues and the resolutions, further data can be requested from the MEMS remotely.

At dashed-block 250, the intelligent building system 100 automatically schedule a mechanic for an on-site fix of the operational issues with respect to the resolutions. That is, if the resolution involves a mechanic to physically replace parts or fix a malfunction, then the computing device 106 can communicate with a scheduling system external to the computing device 106 so that the mechanic is scheduled. In an embodiment, the scheduling system can be part of or connected to a cloud environment connected to the intelligent building system 100. The communications can occur over the cloud environment between the scheduling system and the intelligent building system 100. Note that, in this scenario, the mechanic can arrive at a malfunctioning elevator knowing the problem and with parts for repair in hand. Note that the dotted block 250 is shown with a dashed outline to illustrate that this block is optional for the process flow 200.

Figure 3:
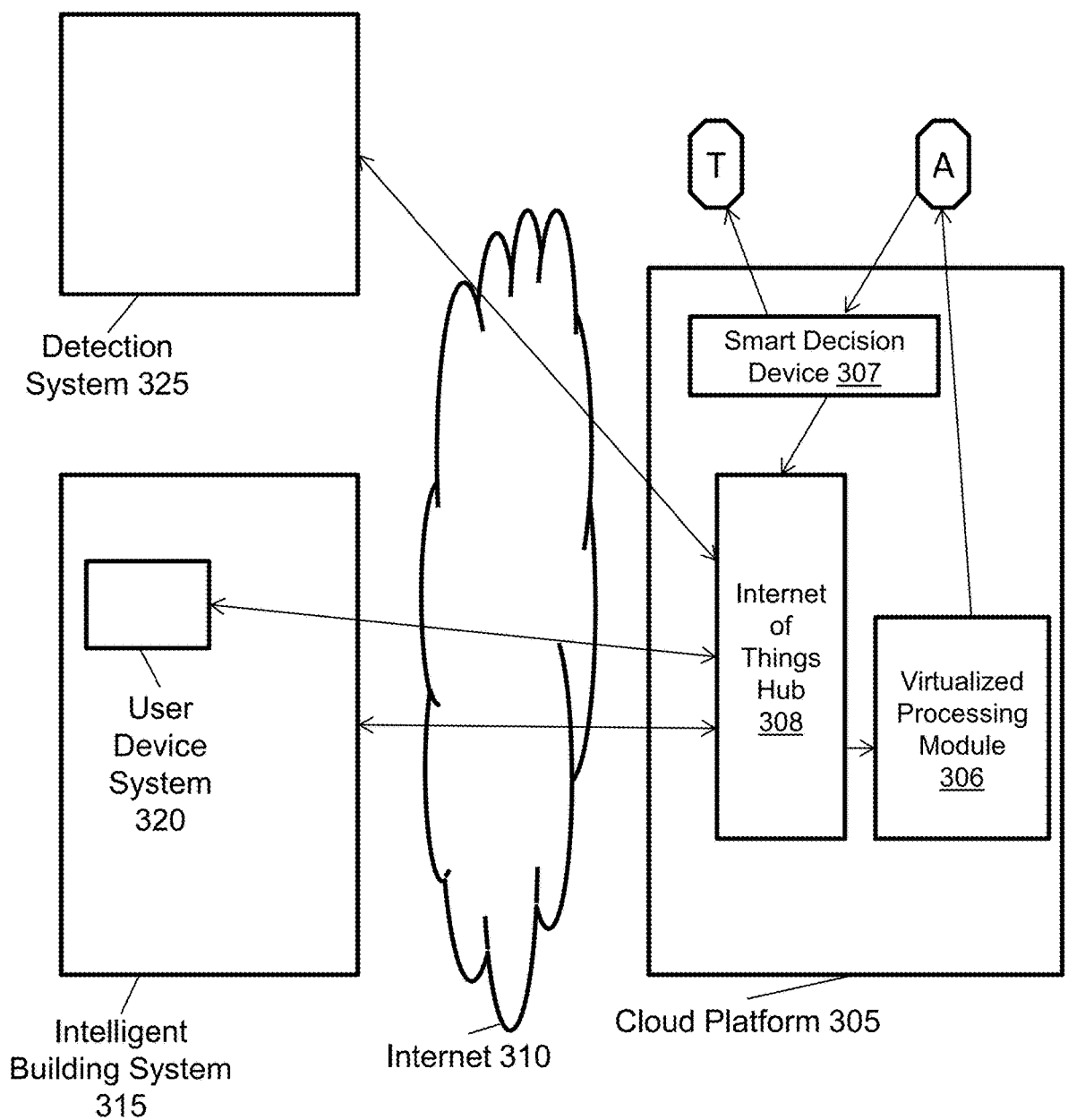
FIG. 3 illustrates an example of system for automatically executing resolutions and/or scheduling a mechanic for an on-site fix according to one embodiment.

Embodiments of selecting and providing multimedia content based on passenger identification with respect to FIG. 3 will now be described. FIG. 3 illustrates an example of system 300 for automatically executing resolutions and/or scheduling a mechanic for an on-site fix according to one embodiment.

As shown, FIG. 3 includes a cloud platform 305 comprising a virtualized processing module 306, a smart decision device 307, and an internet of things hub 308. FIG. 3 also includes an internet 310, an intelligent building system 315, a detection system 325, and a user device system 320, along with an analysist A and a technician T.

The cloud platform 305 utilizes the virtualized processing module 306 to execute the prognostic analysis, operate machine-learning algorithms, and store collected data from the detection system 325, so as to determine operational issues and resolutions. The smart decision device 307 enables the cloud platform to determine a next action based on verifications received from the analyst A. The next action can include scheduling a technician T to visit the intelligent building system 315 and/or providing an automatic fix to the intelligent building system 315 via the internet of things hub 308 (e.g., firmware related fix that can be automatically sent to the intelligent building system 315).

The cloud platform 305 utilizes the internet of things hub 308 to connect to the intelligent building system 315, the detection system 325, and the user device system 320. The cloud platform 305, the intelligent building system 315, the detection system 325, and the user device system can be in constant communication, can be in communication at predetermined time intervals (e.g., once or more a day at predetermined times), or can be in communication when operational issues are detected. The internet 310 provides the connections between these items.

The intelligent building system 315 is an example of an intelligent building system 100 of FIG. 1. The detection system 325 can include sensors for capturing data of an elevator system of the intelligent building system 315. The detection system 325 can include collection devices for providing the captured data to the cloud platform 305. The user device system 320 is a representation of user devices, which include passenger devices, that may receive notification throughout the operation of the along with an analysist A and a technician T.

Figure 4:
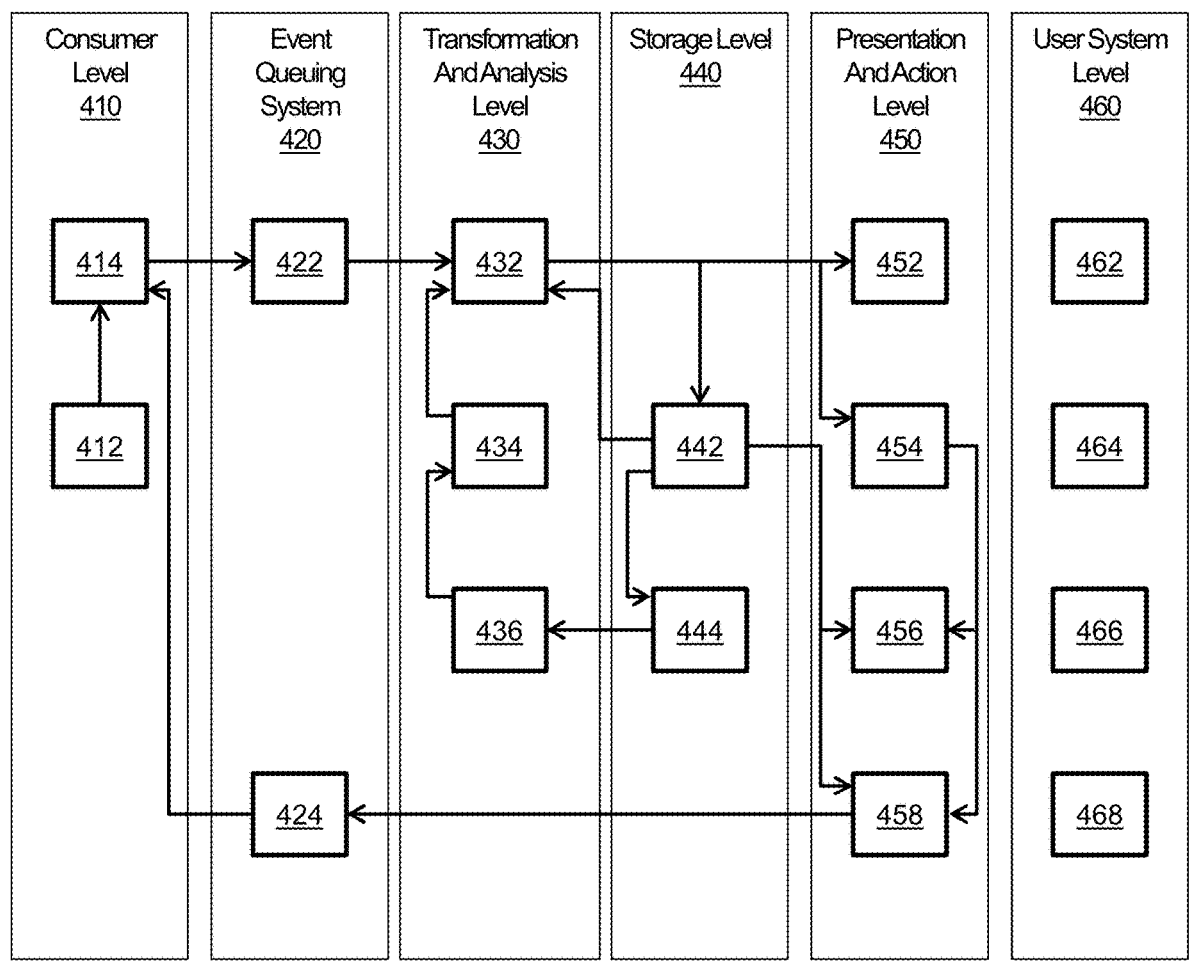
FIG. 4 illustrates a block flow of automatically executing resolutions and/or scheduling a mechanic for an on-site fix according to one embodiment.

FIG. 4 illustrates a block flow 400 of automatically executing resolutions and/or scheduling a mechanic for an on-site fix according to one embodiment. The block flow 400 includes a plurality of logical levels that include hardware and/or software components that communicate to detect and address operational issues of an elevator. The block flow 400 will be described with respect to FIG. 4.

At an event producer and consumer level 410, a detector 412 is used as a data capturing device and to collect data. The detector 412 can be located within an intelligent building system 315. The collected data from the detector 412 is propagated to a controller 414. The controller 414 can establish a connection securely (e.g., using any of advanced message queuing protocol, hypertext transfer protocol, or message queuing telemetry transport protocol) and send the collected data to an event queuing system level 420 Internet of things hub 422.

On the event queuing system level 420, an internet of things hub 422 aggregates instances of the collected data and then provides these aggregated instances to the transformation and analysis level 430. For example, an event hub can be supported on the cloud platform 305 by the internet of things hub 308 (e.g., internet of things hub 422 can internally utilize event hub for sending it to the transformation and analysis level 430).

On the transformation and analysis level 430, analytics are performed on the aggregates instances of collected data before so that resulting operational issues and resolutions are either passed to a storage level 440 or a presentation and action level 450. These analytics can be executed by the virtualized processing module 306 of the cloud platform 305. In an embodiment, the virtualized processing module 306 is part of a physical and/or virtual device of the cloud platform 305 and is operated by the analyst.

On the storage level 440, the aggregates instances of collected data and the resulting operational issues and resolution can be processed by a database 442 and sent to a long-term storage 444. The database 442 and the long-term storage 444 can be physical and/or virtual devices of the cloud platform 305.

On the presentation and action level 450, the aggregates instances of collected data and the resulting operational issues and resolution are organized in a viewer 452 and queued in an event hub 454. In this way, a user (e.g., operational analyst accessing the cloud platform 305) can view the aggregates instances of collected data and the resulting operational issues and resolution via a web or mobile application 456 and communicate verifications via an interface application 458 to the service scheduling mechanism 424, which schedules the mechanic or the firmware updates. The service scheduling mechanism 424 can also take a request for verification or a request for acquiring additional data. Note that any stored data of the database 442 can be accessed by the web or mobile application 456 and the interface application 458 to assist the user in providing the verifications. Further, any stored data of the database 442 or the long-term storage 444 can be provided to the transformation and analysis level 430 for further machine-learning 434 and hindsight analysis 436. Additionally, on a user system level 460, notifications can be sent to smart watches 462, mobile applications 464, web browsers 466, and external system 468.

Figure 5:
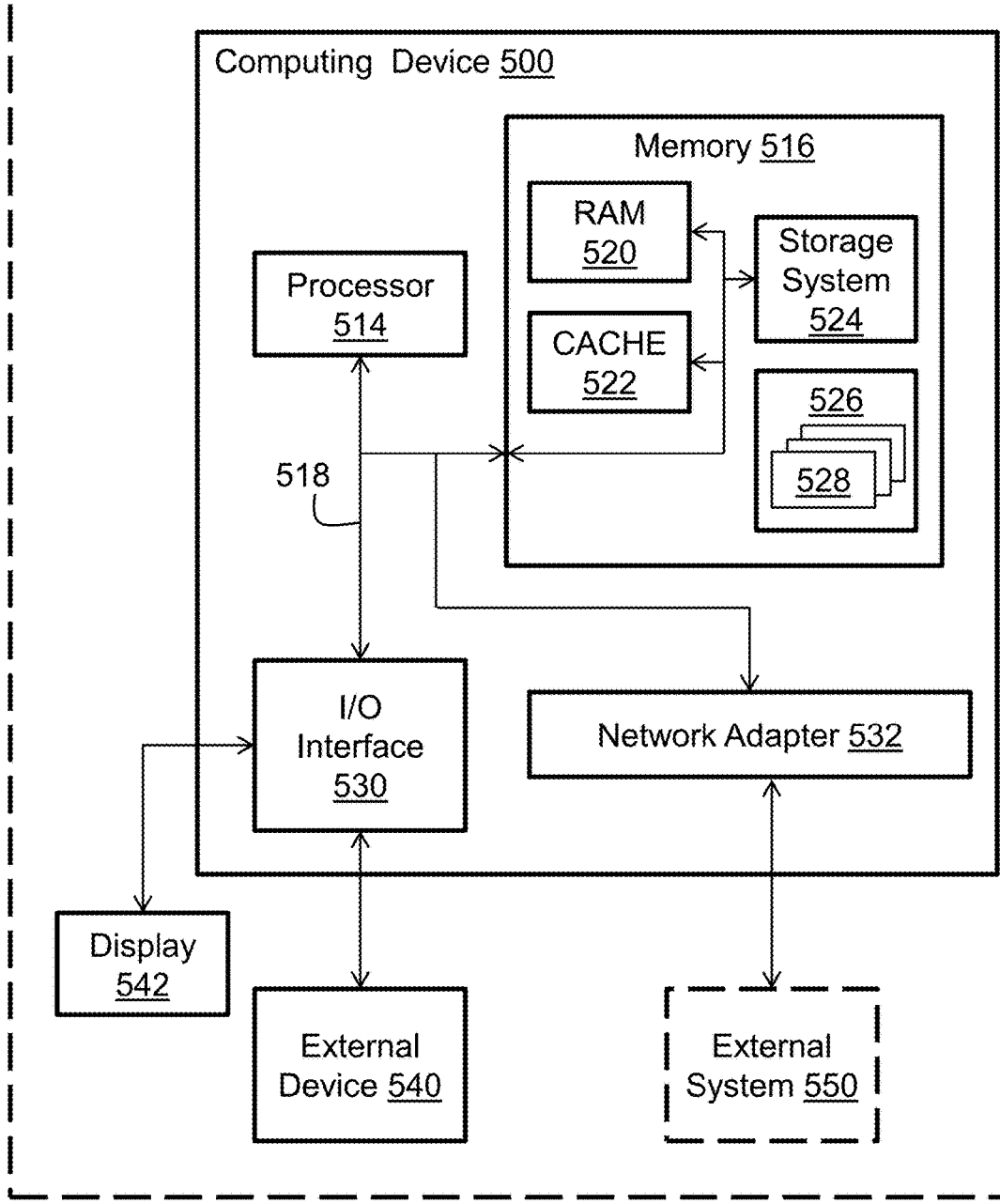
FIG. 5 illustrates a computing system schematic for selecting and providing multimedia content based on passenger identification according to one embodiment.

Referring now to FIG. 5, an example schematic of a computing device 500 is shown. The computing device 500 is only one example of a suitable computing node and is not intended to suggest any limitation as to the scope of use or operability of embodiments of the invention described herein (indeed additional or alternative components and/or implementations may be used). That is, the computing device 500 and elements therein may take many different forms and include multiple and/or alternate components and facilities. Further, the computing device 500 may be any and/or employ any number and combination of computing devices and networks utilizing various communication technologies, as described herein. Regardless, the computing device 500 is capable of being implemented and/or performing any of the operations set forth hereinabove.

The computing device 500 can be operational with numerous other general-purpose or special-purpose computing system environments or configurations. Systems and/or computing devices, such as the computing device 500, may employ any of a number of computer operating systems. Examples of computing systems, environments, and/or configurations that may be suitable for use with the computing device 500 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, computer workstations, servers, desktops, notebooks, network devices, mainframe computer systems, and distributed cloud computing environments that include any of the above systems or devices, and the like.

The computing device 500 may be described in the general context of computer system executable instructions, such as program modules, being executed by a computer system. Generally, program modules may include routines, programs, objects, components, logic, data structures, and so on that perform particular tasks or implement particular abstract data types. The computing device 500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computing device 500 is in the form of a general-purpose computing device that is improved upon by the operation and functionality of the computing device 500, its methods, and/or elements thereof. The components of the computing device 500 may include, but are not limited to, one or more processors or processing units (e.g., processor 514), a memory 516, and a bus (or communication channel) 518 which may take the form of a bus, wired or wireless network, or other forms, that couples various system components including to the processor 514 and the system memory 516. The computing device 500 also typically includes a variety of computer system readable media. Such media may be any available media that is accessible by the computing device 106, and it includes both volatile and non-volatile media, removable and non-removable media.

The processor 514 may receive computer readable program instructions from the memory 516 and execute these instructions, thereby performing one or more processes defined above. The processor 514 may include any processing hardware, software, or combination of hardware and software utilized by the computing device 500 that carries out the computer readable program instructions by performing arithmetical, logical, and/or input/output operations. Examples of the processor 514 include, but are not limited to an arithmetic logic unit, which performs arithmetic and logical operations; a control unit, which extracts, decodes, and executes instructions from a memory; and an array unit, which utilizes multiple parallel computing elements.

The memory 516 may include a tangible device that retains and stores computer readable program instructions for use by the processor 514 of the computing device 500. The memory 516 can include computer system readable media in the form of volatile memory, such as random access memory 520, cache memory 522, and/or the storage system 524.

By way of example only, the storage system 524 can be provided for reading from and writing to a non-removable, non-volatile magnetic media (not shown and typically called a "hard drive", either mechanical or solid-state). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As will be further depicted and described below, the memory 516 may include at least one program product having a set (e.g., at least one) of program modules that are configured to carry out the operations of embodiments of the invention. The storage system 524 (and/or memory 516) may include a database, data repository or other data store and may include various kinds of mechanisms for storing, accessing, and retrieving various kinds of data, including a hierarchical database, a set of files in a file system, an application database in a proprietary format, a relational database management system (RDBMS), etc. The storage system 524 may generally be included within the computing device 500, as illustrated, employing a computer operating system such as one of those mentioned above, and is accessed via a network in any one or more of a variety of manners.

Program/utility 526, having a set (at least one) of program modules 528, may be stored in memory 516 by way of example, and not limitation, as well as an operating system, one or more application programs, other program modules, and program data. Each of the operating system, one or more application programs, other program modules, and program data or some combination thereof, may include an implementation of a networking environment. Program modules 528 generally carry out the operations and/or methodologies of embodiments of the invention as described herein (e.g., the process flow 200).

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computing device 500 may also communicate via an input/output (I/O) interface 530 and/or via a network adapter 532. The I/O interface 530 and/or the network adapter 532 may include a physical and/or virtual mechanism utilized by the computing device 500 to communicate between elements internal and/or external to the computing device 500. For example, the I/O interface 530 may communicate with one or more external devices 540, such as a keyboard, a pointing device, a display 542, etc.; one or more devices that enable a user to interact with the computing device 500; and/or any devices (e.g., network card, modem, etc.) that enable the computing device 500 to communicate with one or more other computing devices. Further, the computing device 500 can communicate with one or more networks such as a local area network (LAN), a general wide area network (WAN), and/or a public network (e.g., the Internet) via network adapter 532. Thus, I/O interface 530 and/or the network adapter 532 may be configured to receive or send signals or data within or for the computing device 106. As depicted, the I/O interfaces 530 and the network adapter 532 communicates with the other components of the computing device 106 via the bus 518. It should be understood that although not shown, other hardware and/or software components could be used in conjunction with the computing device 500. Examples, include, but are not limited to: microcode, device drivers, redundant processing units, external disk drive arrays, RAID systems, tape drives, and data archival storage systems, etc.

While single items are illustrated by the Figures, these representations are not intended to be limiting and thus, any items may represent a plurality of items. In general, computing devices may include a processor (e.g., a processor 514 of FIG. 5) and a computer readable storage medium (e.g., a memory 516 of FIG. 5), where the processor receives computer readable program instructions, e.g., from the computer readable storage medium, and executes these instructions, thereby performing one or more processes, including one or more of the processes described herein.

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computing device, partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described herein. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network and/or a wireless network, comprise copper transmission cables, optical transmission fibers, wireless transmission, routers, firewalls, switches, gateway computers and/or edge servers, and utilize a plurality of communication technologies, such as radio technologies, cellular technologies, etc.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The technical effects and benefits of embodiments herein include reducing elevator downtime based on the prognostic analysis, as elevator owners and operators would get notifications when any recognized pattern of failure occurs. The technical effects and benefits of embodiments herein include reducing a service cost by reducing round trips and analysis time since operational issues can be determined prior to a mechanics first visit at a location. The technical effects and benefits of embodiments herein enabling consultation with experts and formulating appropriate fix to the problem well in advance of a mechanics first visit at a location. Embodiments herein, as implemented and/or claimed, improve the functioning of a computer and/or processor itself by employing a self-learning algorithm to learn on any future cases of problem which may arise, which in turn will help in increasing the product quality and reducing similar issues in the future.

The intelligent building system and method and/or elements thereof may be implemented as computer readable program instructions on one or more computing devices, stored on computer readable storage medium associated therewith. A computer program product may comprise such computer readable program instructions stored on computer readable storage medium for carrying and/or causing a processor to carry out the operations of building system and method.

Aspects are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the Figures illustrate the architecture, operability, and operation of possible implementations of systems, methods, and computer program products according to various embodiments. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method, comprising:
   receiving, by a processor coupled to a memory, a data capture from an elevator sensor;
   executing, by the processor, a prognostic analysis of the data capture to identify operational issues and resolutions to the operational issues;
   receiving, by the processor, a verification of the identified resolutions; and
   executing, by the processor, the resolutions upon verification to resolve the operational issues;
   wherein the prognostic analysis uses pattern recognition to determine operational issues.

2. The method of claim 1, wherein the elevator sensor is a micro-electro-mechanical system.

3. The method of claim 1, wherein the data capture is a recording of video, audio, motion, infrared, radar, sonar, ultrasound, depth, velocity, acceleration, and vibration analytics of the elevator.

4. The method of claim 1, wherein the method comprises automatically reporting the operational issues and resolutions to a user.

5. The method of claim 4, wherein the receiving of the verification is in response to the reporting of the operational issues and resolutions causes.

6. The method of claim 1, wherein the verification is received as an input from a user.

7. The method of claim 1, wherein the method comprises automatically scheduling a mechanic to implement the resolutions,
   wherein the resolutions include an on-site fix of the operational issues.

8. The method of claim 1, wherein the processor and the elevator sensor are local to an intelligent building system comprising an elevator.

9. The method of claim 1, wherein the elevator sensor is local to an intelligent building system comprising an elevator, and
   a cloud environment in communication with the intelligent building system comprises the processor.

10. A system, comprising a processor and a memory storing program instructions thereon, the program instructions executable by a processor to cause the system to perform:
    receiving a data capture from an elevator sensor;
    executing a prognostic analysis of the data capture to identify operational issues and resolutions to the operational issues;
    receiving a verification of the identified resolutions; and
    executing the resolutions upon verification to resolve the operational issues;
    wherein the prognostic analysis uses pattern recognition to determine operational issues.

11. The system of claim 10, wherein the elevator sensor is a micro-electro-mechanical system.

12. The system of claim 10, wherein the data capture is a recording of video, audio, motion, infrared, radar, sonar, ultrasound, depth, velocity, acceleration, and vibration analytics of the elevator.

13. The system of claim 10, wherein the program instructions are executable by a processor to cause the system to perform automatically reporting the operational issues and resolutions to a user.

14. The system of claim 13, wherein the receiving of the verification is in response to the reporting of the operational issues and resolutions causes.

15. The system of claim 10, wherein the verification is received as an input from a user.

16. The system of claim 10, wherein the program instructions are executable by a processor to cause the system to perform automatically scheduling a mechanic to implement the resolutions,
  wherein the resolutions include an on-site fix of the operational issues.

17. The system of claim 10, wherein the processor and the elevator sensor are local to an intelligent building system comprising an elevator.

18. The system of claim 10, wherein the elevator sensor is local to an intelligent building system comprising an elevator, and
  a cloud environment in communication with the intelligent building system comprises the processor.

* * * * *